(12) United States Patent
Tacke

(10) Patent No.: US 9,150,299 B2
(45) Date of Patent: Oct. 6, 2015

(54) SHELL COMPONENT FOR AN AIRCRAFT OR SPACECRAFT

(75) Inventor: Stefan Tacke, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 1064 days.

(21) Appl. No.: 13/130,257

(22) PCT Filed: Nov. 25, 2009

(86) PCT No.: PCT/EP2009/065823
§ 371 (c)(1),
(2), (4) Date: Aug. 18, 2011

(87) PCT Pub. No.: WO2010/063627
PCT Pub. Date: Jun. 10, 2010

(65) Prior Publication Data
US 2011/0297788 A1  Dec. 8, 2011

Related U.S. Application Data

(60) Provisional application No. 61/118,745, filed on Dec. 1, 2008.

(30) Foreign Application Priority Data

Dec. 1, 2008 (DE) .......................... 10 2008 044 229

(51) Int. Cl.
*B64C 1/06* (2006.01)
(52) U.S. Cl.
CPC .................................... *B64C 1/061* (2013.01)

(58) Field of Classification Search
CPC ........ B64C 1/061; B64C 1/062; B64C 1/064; B64G 1/00
USPC ...................... 244/119, 131, 132, 133, 158.1
See application file for complete search history.

(56) References Cited

U.S. PATENT DOCUMENTS 7,134,629 B2 * 11/2006 Johnson et al. ............... 244/119
7,963,477 B2 * 6/2011 Soula et al. .................... 244/1 A
8,353,479 B2 * 1/2013 Tacke et al. ................... 244/119

(Continued)

FOREIGN PATENT DOCUMENTS

DE     102006051462    5/2008
EP     0048191         3/1982

(Continued)

OTHER PUBLICATIONS

German Office Action, Mar. 8, 2012.

*Primary Examiner* — Rob Swiatek
(74) *Attorney, Agent, or Firm* — Greer, Burns & Crain Ltd.

(57) ABSTRACT

A shell component for an aircraft or spacecraft. The shell component includes a skin panel, a plurality of stringers which are arranged on the skin panel, a former which includes a fiber composite material and is arranged over the stringers so as to cross the stringers, and a former connection structure which includes a ductile material and a plurality of foot portions fixed to the skin panel. The foot portions each transition integrally into a shoulder portion fixed to the former over an associated fixing span, the fixing spans associated with the foot portions extending along the former substantially continuously over the stringers.

19 Claims, 3 Drawing Sheets

(56) References Cited

U.S. PATENT DOCUMENTS

2006/0231682 A1 10/2006 Sarh
2010/0237195 A1* 9/2010 Stephan .................. 244/132

FOREIGN PATENT DOCUMENTS

| WO | WO 2006/001859 | 1/2006 |
| WO | WO 2008/067460 | 6/2008 |

* cited by examiner

SHELL COMPONENT FOR AN AIRCRAFT OR SPACECRAFT

CROSS-REFERENCE TO RELATED APPLICATIONS

This application claims the benefit of U.S. Provisional Application No. 61/118,745, filed Dec. 1, 2008 and German Patent Application No. 10 2008 044 229.1, filed Dec. 1, 2008, the entire disclosures of which are herein incorporated by reference.

FIELD OF THE INVENTION

The present invention relates to a shell component for an aircraft or spacecraft. The invention further relates to an aircraft or spacecraft and to a fuselage section of an aircraft or spacecraft comprising a shell component of this type.

Although applicable to any lightweight constructions comprising a reinforced outer skin, the present invention and the problem on which it is based will be explained in greater detail with reference to components of the fuselage shell of aircraft.

In aircraft construction, fuselage structures are normally produced from reinforced skin panels, formers, crossbars for the floor of a passenger cabin and crossbars or a lattice for the floor of a hold area. The individual components are conventionally produced from metal, for example from aluminium or an aluminium alloy, and are connected by means of rivets or bolts. Should the fuselage barrel collide vertically with the ground a large portion of the impact energy will be consumed by the plastic-elastic behaviour of the metal components, which gradually deform under the action of the impact forces, thus ensuring the safety of the passengers.

However, when manufacturing bearing fuselage structures, metal materials are increasingly being replaced by fibre composite materials, in particular by carbon fibre reinforced plastics material (CFRP), since a lighter overall weight of the aircraft and therefore lower energy consumption during flight operation can thus be achieved with the same strength and rigidity.

Whilst metal materials gradually deform plastically under overload and absorb energy, the material breaks suddenly in the case of fibre composite materials, in particular in the case of CFRP, with very low energy absorption. In the event of a collision of the fuselage barrel with the ground this brittle behaviour leads to abrupt failure of a large portion of the structure with insufficient impact energy having been absorbed.

SUMMARY OF THE INVENTION

The object of the present invention is therefore to improve, with low overall weight, the energy absorption behaviour of an aircraft fuselage structure in the event of an overload, in particular when the structure is produced substantially from fibre composite materials.

This object is achieved in accordance with the invention by a fuselage shell component for an aircraft or spacecraft having the features of claim.

The idea on which the present invention is based consists in providing, in a shell component comprising a skin panel reinforced by stringers and a former which comprises a fibre composite material and therefore is of low inherent weight, a former connection structure comprising a ductile material which connects the former to the skin panel, within a given length range which crosses the stringer, and also reinforces the former over this length range in a substantially continuous manner.

In order to connect the former to the skin panel the former connection structure comprises a plurality of foot portions which are fixed to the skin panel and, for example, each directly contact the skin panel in a region arranged between two stringers. Alternatively or in addition to the direct fixing to the skin panel, the foot portions may also be fixed indirectly to the skin panel, for example by being fixed to portions of the stringers or in that connection pieces are inserted between the skin panel and the foot portions.

The foot portions each transition integrally into a shoulder portion which is fixed to the former over an associated fixing span. In this instance the term 'fixing span' refers to the portion along the extent of the former which is mounted by the fixing points between the shoulder portion in question and the former. It is possible for different foot portions to transition into different associated shoulder portions over correspondingly different fixing spans, and also for different foot portions to transition into the same shoulder portion with which they are commonly associated. In this case, if a plurality of shoulder portions associated with the foot portions, the associated fixing spans are supplemented along the former substantially continuously over the length range by overlapping one another or abutting one another without any substantial gaps. If only one common shoulder portion is associated with the foot portions, it extends alone over the length range, i.e. over the stringers.

If, in the event of an overload (for example in the event of a collision of an aircraft fuselage with the ground), the fibre composite material of the former suddenly fails at any point over the length region thereof which is reinforced substantially continuously in this manner, the ductile material of the former connection structure makes plastic deformation and thus absorption of impact energy possible at this point. The former connection structure thus fulfils a double function: it connects the former to the skin panel and also absorbs energy in the event of an overload. This makes it possible to provide the shell component with improved energy absorption behaviour, without increasing its weight with additional reinforcing components.

In a preferred development the ductile material is formed as a metal material. This enables high stability. The metal material is preferably titanium or a titanium alloy, thus providing particularly good stability, ductility and corrosion resistance.

In a further preferred development the ductile material is formed as a thermoplastic polymer. This enables particularly light construction. The thermoplastic polymer is preferably fibre-reinforced so as to achieve increased stability. The fibre reinforcement may comprise both long and short fibres (for example 1-5 cm).

In a further preferred development the ductile material is formed as a short-fibre-reinforced thermosetting material. This enables light construction of the shell component with good heat stability. For example the short fibres are approx. 1-5 cm long. The short-fibre-reinforced thermosetting material exhibits quasi-ductile behaviour since short fibres are drawn from the polymer matrix in the event of an overload and can absorb energy, which improves energy absorption in the event of an overload.

In a preferred development the fixing spans overlap one another along the former. For one thing, this increases the stability of the connection between the former and the former connection structure.

In a preferred development the shoulder portions overlap one another along the former. Adjacent shoulder portions are thus interconnected in a particularly rigid manner, in such a way that they remain inter-connected and can absorb impact energy even if the former fails in the overlap region.

In a preferred development at least two shoulder portions are fixed to the former by means of a common fixing element. The number of fixing elements required at a given connection stability is thus particularly low, which reduces the weight of the shell component.

In a further preferred development at least two foot portions are connected integrally to the same shoulder portion. A particularly high level of strength is thus achieved.

In a preferred development the plurality of stringers comprises at least five stringers. The former connection structure can thus be deformed in a ductile manner over a wide area, in such a way that the shell component can absorb large amounts of impact energy.

In a preferred development the fixing spans associated with the foot portions extend along the former, substantially continuously, over at least 1 m. The former connection structure can thus also be deformed in a ductile manner over a wide area, in such a way that the shell component can absorb large amounts of impact energy.

In a preferred development a fuselage section of an aircraft or spacecraft is provided with a shell component of this type. The former connection structure preferably extends in a peripheral direction of the fuselage section over a substantial portion of a lower half shell of the fuselage section. Since in a crash from a low height it is highly likely that the fuselage will not twist and the lower half shell will impact the ground, the energy absorption in the most likely collision scenarios can thus be improved at low cost. For example the main portion of the lower half shell comprises a region defined by connection points of the base of a hold on either side of the fuselage section. This is the region most likely to impact the ground in a crash.

BRIEF DESCRIPTION OF THE DRAWINGS

In the following, the invention is described in greater detail on the basis of embodiments with reference to the accompanying figures of the drawings, in which.

DESCRIPTION OF EXEMPLARY EMBODIMENTS

Figure 1:
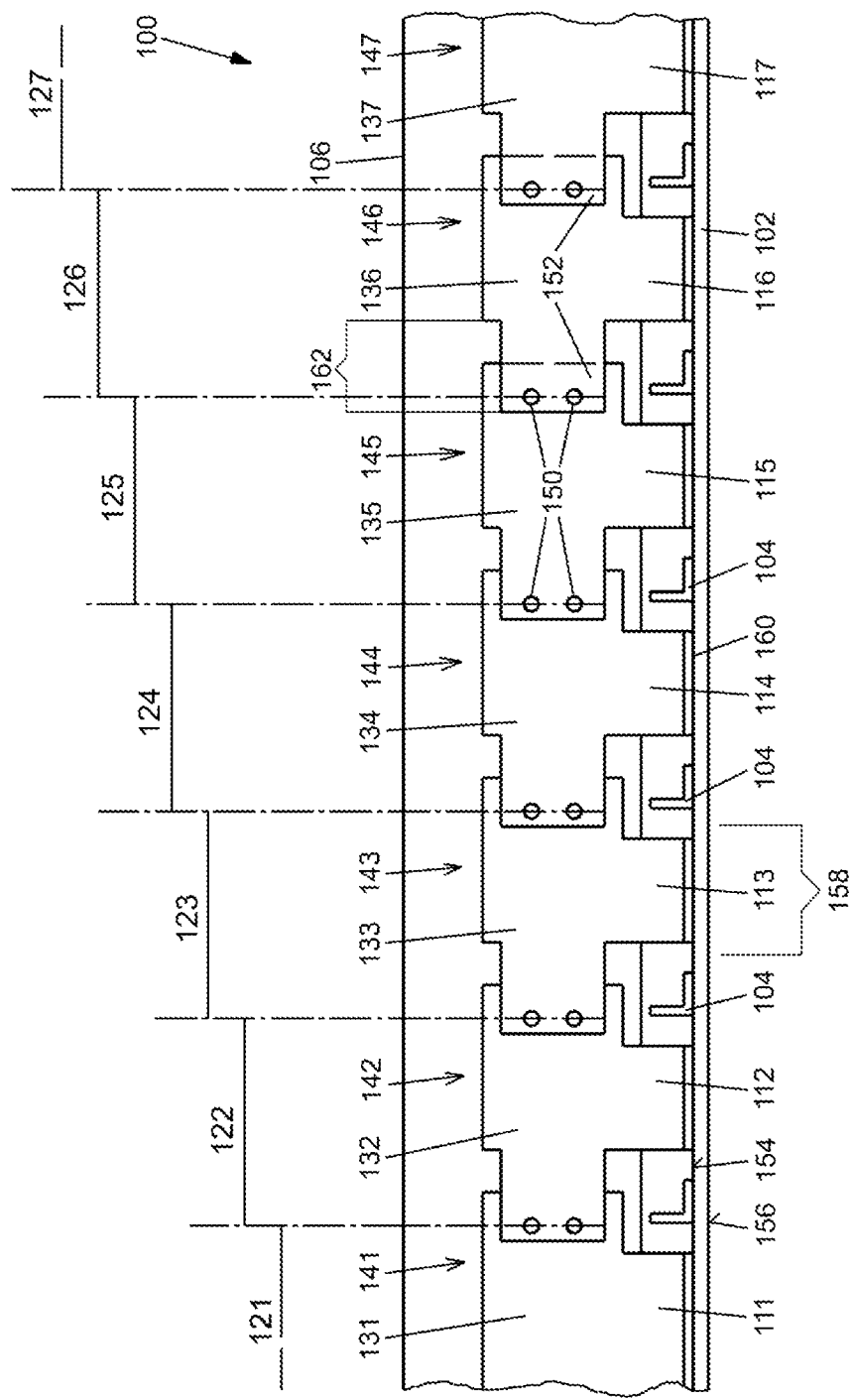
FIG. 1 is a schematic, cut-away side view of a shell component according to a first embodiment of the invention.

In the figures, like reference numerals denote like or functionally equivalent components, unless indicated otherwise.

FIG. 1 is a schematic, cut-away side view of a shell component 100 for an aircraft fuselage. The shell component 100 comprises a skin panel 102 formed of a carbon fibre reinforced plastics material which, in the installed state of the shell component 100, forms a portion of the outer skin of the aircraft fuselage. A number of stringers 104 extend over an inner face 154 of the skin panel at approximately regular distances parallel to one another and perpendicular to the plane of the drawing. The stringers 104 also consist of carbon fibre reinforced plastics material, in this instance have an L-shaped profile by way of example, and are adhesively bonded for example to the inner face 154 of the skin panel.

The direction of the stringers 104 basically corresponds to the direction of the longitudinal axis of the aircraft. In a conventional, approximately cylindrical fuselage the outer face 156 of the skin panel 102 is convexly curved outwards, i.e. downwards in FIG. 1, but is shown as being planar in this instance for reasons of simplicity.

The shell component 100 further comprises a former 106 which also consists of carbon fibre reinforced plastics material. If the inner face 154 of the skin panel 102 is taken as a base surface, the former 106 extends above the stringer 104 in the plane of the drawing, i.e. transverse to the longitudinal direction of the aircraft, and crosses the stringer 104 without contacting it.

The shell component 100 further comprises a former connection structure which consists of a plurality of former connection segments 141-147, connects the former 106 to the skin panel 102 and comprises a ductile material. "Ductile material" is to be understood to mean materials which do not suddenly fail under overload, but instead absorb energy by plastic deformation or other quasi-ductile processes, such as the extraction of fibres from a matrix, before they fail. For example, the ductile material may be titanium T40, titanium T60 or another metal, a long-fibre-reinforced thermoplastic polymer such as a PPS matrix with woven fabric or single-ply reinforcements made of glass fibre or carbon fibre, a short-fibre-reinforced thermoplastic polymer or thermosetting material such as HexMC, or another suitable material.

The former connection segments 141-147 are basically planar and are arranged in a plane which extends perpendicular to the skin panel 102 and extends directly in front of the former 106 and parallel thereto, as viewed from the direction of the viewer of FIG. 1, in such a way that it contacts the former 106.

Each former connection segment 141-147 comprises a corresponding foot portion 111-117 which is connected to the skin panel 102 in a respective connection region 158 arranged between two adjacent stringers 104. For example, the foot portions 111-117 of the former connection segments 141-147 each comprise a portion 160 which is bent parallel to the skin panel 102 and is connected to the skin panel 102, for example by riveting or adhesive bonding.

The former connection segments 141-147 extend from their respective connection regions 158 towards the former 106, broadening at the level of the former 106 and transitioning integrally into a respective shoulder portion 131-137. The shoulder portion 131-137 of each former connection segment 141-147 is in each case so wide that it extends along the former 106 until above the stringers 104 arranged on either side of the respective connection region 158, and the shoulder portions 131-137 of adjacent former connection segments 141-147 overlap in a respective overlap region 152. For this purpose each shoulder portion comprises, on one of the sides in its direction of width (in FIG. 1 the left-hand side as seen by the viewer), a strip portion 162, of which the height is reduced compared to the other shoulder portion 131-137. The strip portion 162 comprises a permeation which makes it possible for a former connection segment, for example the former connection segment 146, to rest on the shoulder portion 135 of the adjacent former connection segment 145 in the overlap region 152 of the strip portion 162, whereas the shoulder portion 136 rests on the former 106 outside the overlap region 152.

Each of the fixing elements 150 is arranged in the overlap region 152 and connects the former connection segments 141-147 overlapping in the respective region 152 to the former 106. For example the fixing elements 150 are rivets which are each arranged in holes, said rivets and holes penetrating the former connection segments 141-147 and the former 106 in an overlapping manner.

The distance along the former 106 between the fixing elements 150, with which each former connection segment 141-147 is fixed to the former 106 at either end via its shoulder portion 131-137, defines a fixing span 121-127 associated with the respective former connection segment 141-147 or the foot portion thereof 111-117 as a distance portion along the length of the former 106. In the present embodiment the fixing elements 150 each simultaneously form the left-hand border of one of the fixing spans 121-127 and the right-hand border of another of the fixing spans 121-127, so the fixing spans 121-127 associated with adjacent foot portions 111-117 are arranged continuously in succession. All the fixing spans 121-127 as a whole thus extend continuously over the stringers 104.

In order to produce the shell component 100, the skin panel reinforced by the plurality of stringers 104 is produced first, for example. The former connection structure 141-147 is then fixed to the skin panel via its foot portions 111-117, the individual former connection segments being handled easily owing to the segmentation and it being possible to compensate for any tolerances of the skin panel 102. Lastly, the former 106 is arranged above the stringers 104 in its assembly position and the shoulder portions 131-137 are fixed to the former 106 over the associated fixing spans 121-127, for example by means of common fixing elements in the overlap regions 152 of adjacent former connection segments 141-147.

Figure 2:
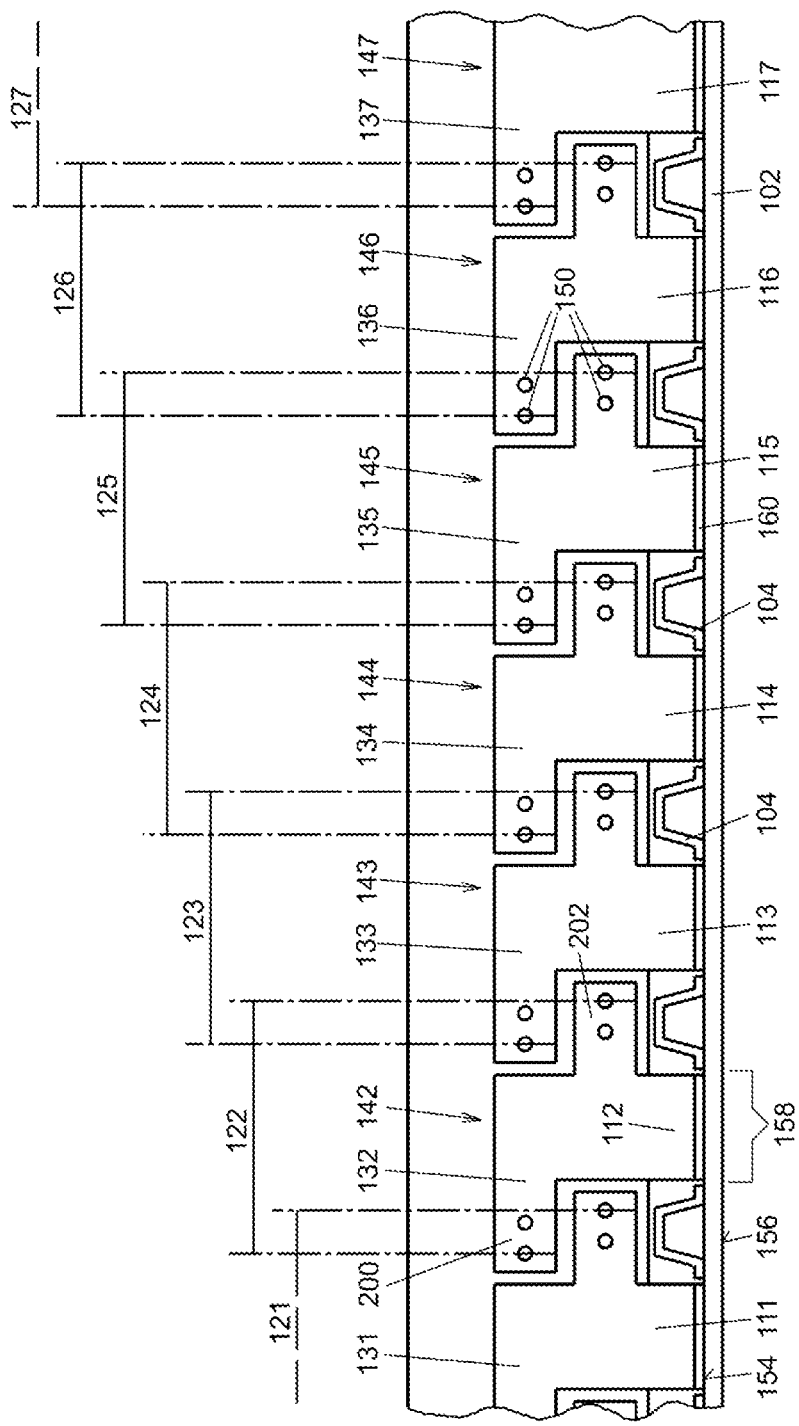
FIG. 2 is a schematic, cut-away side view of a shell component according to a second embodiment.

FIG. 2, also in a side view, shows a shell component 100 for an aircraft fuselage in a further embodiment. As in the embodiment of FIG. 1, a number of stringers 104 extend over an inner face 154 of the skin panel 102 at approximately regular distances, parallel to one another and perpendicular to the plane of the drawing, the stringers 104 having an Ω-shaped profile in this instance by way of example.

As in the embodiment of FIG. 1, the shell component 100 comprises a former connection structure which consists of a plurality of former connection segments 141-147, connects a former 106 to the skin panel 102 and comprises a material having ductile or quasi-ductile properties. Unlike in the embodiment of FIG. 1, each former connection segment 141-147 comprises on its shoulder portion 131-137 an upper shoulder projection 200 and a lower shoulder projection 202 which extend away at different heights over the inner face 154 of the skin panel 102 along the former 106 in opposite directions above the adjacent stringers 104 arranged on either side in each case.

The dimensions and the difference in height of the strip projections 200, 202 are selected in this case in such a way that adjacent former connection segments 141-147 are not contacted on either side. This makes it possible for the former connection segments 141-147 to be produced cost-effectively in a simple, for example planar manner without having to form permeations or the like. Similarly to when they are assembled, when the former connection segments 141-147 are produced the tolerance requirements are particularly low, which makes it possible to achieve further cost savings. However, there is an indirect overlap between adjacent former connection segments 141-147 in the sense that the projections of the widths of adjacent shoulder portions 131-137 over the skin panel 102 overlap one another along the former 106.

Fixing elements 150 are arranged in each case on the strip projections 200, 202 of the shoulder portions 131-137, by means of which fixing elements the shoulder portions 131-137 in question are fixed to the former 106. For example, the fixing elements 150 are rivets which are arranged in holes and each penetrate one of the strip projections 200, 202 and the former 106.

In the present embodiment the distance along the former 106 between the outermost fixing elements 150, with which each former connection segment 141-147 is fixed to the former 106 at the two strip projections 200, 202 of its shoulder portion 131-137, also defines a fixing span 121-127 associated with the respective former connection segment 141-147 or the foot portion 111-117 thereof. Unlike in the embodiment of FIG. 1, the fixing spans 121-127 associated with adjacent foot portions 111-117 overlap. All of the fixing spans 121-127 as a whole thus extend continuously over the stringers 104.

Figure 3:
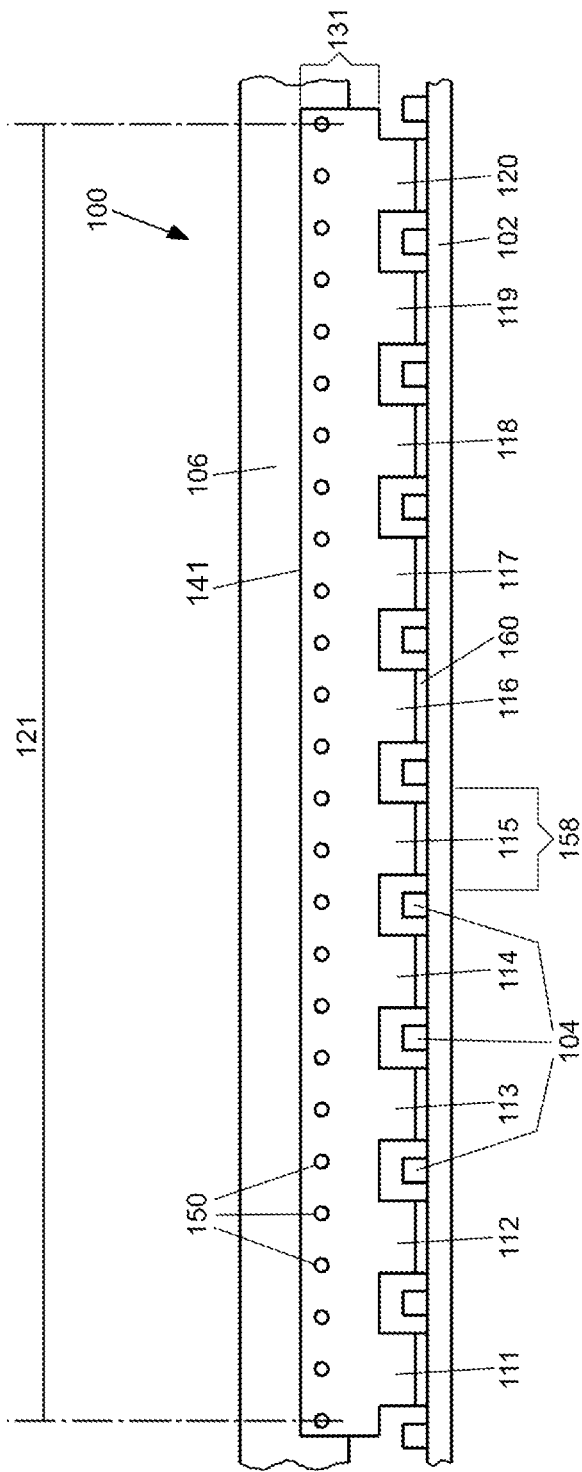
FIG. 3 is a schematic, cut-away side view of a shell component according to a third embodiment.

FIG. 3, also in a side view, shows a shell component 100 for an aircraft fuselage according to yet another embodiment. As in the embodiments of FIGS. 1 and 2, a number of stringers 104 extend over an inner face 154 of a skin panel 102 at approximately regular distances, parallel to one another and perpendicular to the plane of the drawing, in this instance the stringers 104 having a rectangular profile by way of example.

As in the embodiment of FIG. 1, the shell component 100 comprises a former connection structure 141 which connects a former 106 to the skin panel 102 and comprises a material having ductile or quasi-ductile properties. Unlike in the embodiments of FIGS. 1 and 2 however, the former connection structure 141 consists only of a single segment 141 which comprises, in the manner of a thrust comb, a plurality of integrally moulded foot portions 111-120 which are each connected to the skin panel 102 in connection regions 158 arranged between different adjacent pairs of stringers 104. Conversely, the foot portions 111-120 transition integrally into a single shoulder portion 131 of the former connection structure 141 which extends along the former 106 above the stringers 104 and is fixed to the former 106 by a row of fixing elements 150, such as rivets. The distance at which the fixing elements 150 are spaced from one another is selected in such a way that the former connection structure 141 is connected in a stable manner to the former in the region of each foot portion 111-120.

In the present embodiment the distance along the former 106 between the outermost fixing elements 150, by means of which the shoulder portion 131 of the one-piece former connection structure 141 is fixed to the former 106, also defines a fixing span 121 which is associated in this instance with the one-piece former connection structure 141 or with each of the individual foot portions 111-120 thereof. The fixing span 121 extends continuously over the stringers 104.

In an aircraft fuselage or a fuselage section of an aircraft, a former connection structure as described with reference to FIGS. 1-3 extends for example along the entire length of a former, i.e. annularly around the entire periphery of the aircraft fuselage. Alternatively, merely portions of a former may be provided with a former connection structure of this type, so savings in terms of cost and/or additional weight can be made.

For example the former connection structure extends in a peripheral direction of the fuselage section over the lower half shell of the fuselage section or at least over a substantial portion of the lower half shell, for example over a region defined by the connection points of floor support rods on either side of the fuselage section. In a falling, untwisted fuselage the impact energy can thus be absorbed as fully as possible by the former connection structure before the connection points of floor support rods contact the ground, so as to avoid the floor support rods being forced through the passenger floor.

If the former connection structure extends over a portion of the lower half shell, which is defined by the connection points of a passenger floor on either side of the fuselage section, a high level of energy absorption is achieved even if a fuselage is twisted considerably about its longitudinal axis at the time of impact.

Although the present invention has been described with reference to preferred embodiments, it is not limited thereto and may be modified in various ways.

For example, different portions of the former connection structure can be designed in different manners, for example in pieces with former connection segments which overlap and/or former connection segments which do not overlap and/or in one piece. Small gaps may remain between fixing spans of adjacent former connection segments provided these gaps are so small that the former is basically continuously reinforced by the ductile material.

LIST OF REFERENCE NUMERALS 100 shell component
102 skin panel
104 stringer
106 former
111-120 foot portion
121-127 fixing span
131-137 shoulder portion
141-147 former connection structure
150 fixing element
152 overlap region
154 inner face
156 outer face
158 connection portion
160 curved portion
162 strip portion
200 upper shoulder projection
202 lower shoulder projection

The invention claimed is:

1. A fuselage shell component for an aircraft or spacecraft, comprising: a skin panel; a plurality of stringers which are arranged on the skin panel; a former which comprises a fibre composite material and is arranged over the stringers; and a former connection structure which comprises a ductile material, which is formed so as to absorb energy upon impact, and a plurality of foot portions fixed to the skin panel, each of which foot portions transitions integrally into a shoulder portion fixed to the former over an associated fixing span for each foot portion, the fixing spans belonging to the foot portions extending along the former substantially continuously over the stringers, wherein the fixing spans overlap one another along the former.

2. The fuselage shell component according to claim 1, wherein the ductile material is formed as a metal.

3. The fuselage shell component according to claim 2, wherein the metal ductile material is one of titanium and a titanium alloy.

4. The fuselage shell component according to claim 1, wherein the ductile material is formed as a thermoplastic material.

5. The fuselage shell component according to claim 4, wherein the thermoplastic material is fibre-reinforced.

6. The fuselage shell component according to claim 1, wherein the ductile material is formed as plastics material which is reinforced with short fibres from 1 cm to 5 cm long.

7. The fuselage shell component according to claim 1, wherein at least two shoulder portions are interconnected in one piece.

8. The fuselage shell component according to claim 1, wherein the plurality of stringers comprises at least five stringers.

9. The fuselage shell component according to claim 1, wherein the fixing spans belonging to the foot portions extend along the former substantially continuously over at least 1 m.

10. A fuselage section of an aircraft or spacecraft comprising a shell component according to claim 1.

11. An aircraft or spacecraft comprising a fuselage section according to claim 10.

12. The fuselage section according to claim 10, wherein the former connection structure extends in a peripheral direction of the fuselage section over a substantial portion of a lower half shell of the fuselage section.

13. An aircraft or spacecraft comprising a fuselage shell component according to claim 1.

14. A fuselage shell component for an aircraft or spacecraft, comprising: a skin panel; a plurality of stringers which are arranged on the skin panel; a former which comprises a fibre composite material and is arranged over the stringers; and a former connection structure which comprises a ductile material, which is formed so as to absorb energy upon impact, and a plurality of foot portions fixed to the skin panel, each of which foot portions transitions integrally into a shoulder portion fixed to the former over an associated fixing span for each foot portion, the fixing spans belonging to the foot portions extending along the former substantially continuously over the stringers, wherein the shoulder portions overlap one another along the former.

15. The fuselage shell component according to claim 14, wherein the ductile material is formed as a metal.

16. The fuselage shell component according to claim 14, wherein the ductile material is formed as a thermoplastic material.

17. A fuselage shell component for an aircraft or spacecraft, comprising: a skin panel; a plurality of stringers which are arranged on the skin panel; a former which comprises a fibre composite material and is arranged over the stringers; and a former connection structure which comprises a ductile material, which is formed so as to absorb energy upon impact, and a plurality of foot portions fixed to the skin panel, each of which foot portions transitions integrally into a shoulder portion fixed to the former over an associated fixing span for each foot portion, the fixing spans belonging to the foot portions extending along the former substantially continuously over the stringers, wherein at least two shoulder portions are fixed to the former by means of a common fixing element.

18. The fuselage shell component according to claim 17, wherein the ductile material is formed as a metal.

19. The fuselage shell component according to claim 17, wherein the ductile material is formed as a thermoplastic material.

* * * * *